Sept. 7, 1926.  
J. C. AXELSON  
1,599,270  
SUCKER ROD  
Filed March 31, 1923

INVENTOR  
JULE C. AXELSON  
BY  
Graham + Lanier  
ATTORNEYS

Patented Sept. 7, 1926.

1,599,270

UNITED STATES PATENT OFFICE.

JULE C. AXELSON, OF LOS ANGELES, CALIFORNIA, ASSIGNOR TO AXELSON MACHINE CO., A CORPORATION OF CALIFORNIA.

SUCKER ROD.

Application filed March 31, 1923. Serial No. 629,001.

My invention relates to sucker rods such as are used in oil wells.

The principal object of the invention is to provide a sucker rod having a pin which is very much stronger than the present form of pin now in general use.

A further object of the invention is to provide, in combination with such a pin, a novel form of coupling member which is adapted to cooperate with such pin.

A further object of the invention is to provide a pin and coupling member which are frictionally retained together to prevent unscrewing.

A still further object of the invention is to provide on such a pin a novel form of screw thread.

Referring to the drawing, which is for illustrative purposes only,

Figure 3:
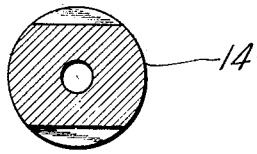
Fig. 3 is a section on a plane represented by the line 3—3 of Fig. 1.

In the embodiment of the invention illustrated, I show a sucker rod 11, which is preferably of cylindrical section, and which is joined to a head 12 which may be square in shape to allow wrenches to be applied thereto. Formed on the head 12 is a pin 13 of peculiar construction. The pin 13 is threaded into a hole formed in a coupling member 14, the coupling member 14 having a hole at either end so that two sucker rods can be readily joined by the coupling member. The coupling member may be cylindrical in cross section but is preferably formed with flat portions thereon, as shown in Fig. 3.

Figure 1:
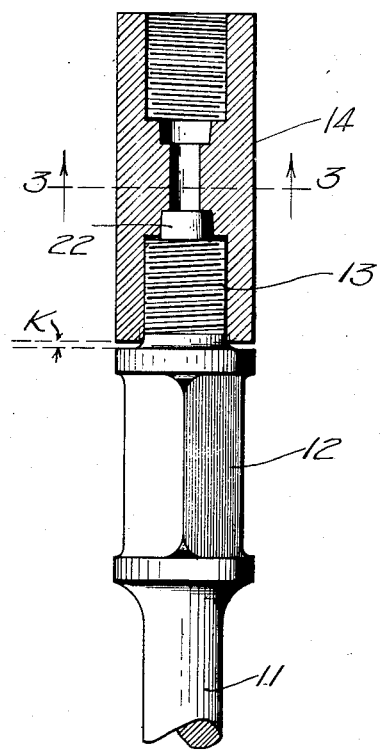
Fig. 1 is a view of a coupling rod end with a pin thereon and of a coupling member in place on the pin, the coupling member being shown in cross section.
Figure 2:
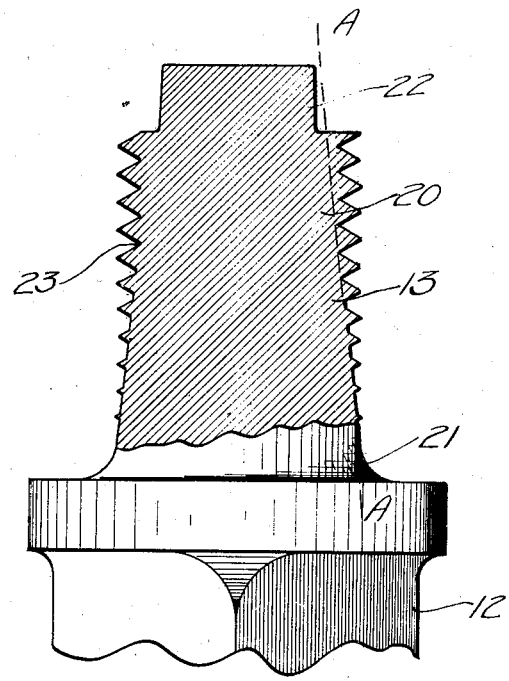
Fig. 2 is an enlarged view, partly in section, of a preferred form of pin.

The pin 13 consists of a central threaded portion 20 which terminates in a curved shoulder 21 at the head 12 and which carries a conical projection 22 at its outer end. The threaded portion 20 is preferably of substantially uniform outside diameter, but has a thread cut thereon which is of variable depth, the bottom of the threads being along the line A—A which is inclined with respect to the axis of the pin. The threads are of full depth from a point immediately adjacent to the portion 22 to an intermediate point 23, the depth of thread becoming thereafter constantly less as it approaches the portion 21. The taper on the exterior of the unthreaded portion is very slight and the hole in the coupling member 14 is reamed to the same taper so that the member 22 fits tightly in this hole. The depth of the hole in the member 14 is slightly less than the length of the pin so that when the parts are screwed together and the unthreaded portion 22 is firmly seated in the recess in the bottom of the hole provided therefor, the shoulder formed on the head 12 is a short distance from the end of the coupling 14, this distance being diagrammatically shown at K in Fig. 1.

It is a well known fact that the strength of any threaded member is determined by its effective diameter at the base of the threads. By providing the peculiar form of thread shown, I am able to utilize the entire diameter of the pin 13 at its base and, at the same time, to provide sufficient threads to securely hold the pin in the coupling 14. This strengthening of the pin is further accomplished by the rounded shoulders 21 which still further increase the strength at the base. The strength is still further increased by allowing the end of the pin to solidly seat in the bottom of the hole in the coupling 14 before the shoulder seats against the end of this coupling. This prevents the pin from having to carry, in addition to the weight of the sucker rods, an additional load due to the pin being screwed up too tight and thus having an additional strain thereon.

By providing the slight taper on the member 22, I am able to provide a wedging action which effectually prevents the sucker rod from unscrewing in the well, the amount of this wedging action being determined by the amount the sucker rods are set up when they are assembled.

It will thus be seen that my type of sucker rod is stronger than the ordinary type; first, because of the peculiar form of thread used; secondly, because of the curved shoulder 21; thirdly, because the sucker rod pin seats on its end and the shoulder does not seat upon the end of the coupling.

The form of thread according to this invention, in which full threads are used from the end of the pin for a distance about equal to the diameter of the pin at the base of the full thread, and in which thereafter the thread is made gradually shallower, has a peculiar utility. I have found that sucker rods of the conventional or straight thread type having pins with threads of uniform depth throughout their length fail ordinarily by pulling the pin apart due to the lack of sufficient tensile strength in the pin. This condition I eliminate by my new design. In the conventional or straight thread design having threads of uniform depth throughout the length of the pin, the pin is weak in tension and the threads have considerably greater shearing value than is necessary. On the other hand, in a pin with a full vanishing thread in which the taper is carried to the end of the pin, the pin is no stronger at the base than in the present invention, but the threads are much weaker in shear at every point of the pin than in the present design. By use of the structure of the present invention, that is, by using a straight full thread until the strength of shear of the thread is approximately equal to the strength in tension of the rod and then gradually causing the thread to vanish by increasing the diameter of the rod, i. e., the root diameter of the thread, I greatly increase the strength of the joint over both a straight thread joint having a straight full thread carried the whole length of the pin since the diameter at the base of the pin is increased, and over a full vanishing thread joint having a thread which starts to grow shallower at the extreme end of the pin, since my thread is stronger in shear throughout its length.

In the structure of the present invention the strength of the rod in tension at the point of juncture of the full thread with the vanishing thread is theoretically equal to the shearing strength of the threads of uniform depth up to that point, and from this point to the base of the pin the diameter, cross sectional area, and tensile strength of the pin increase, and the shearing strength of the thread increases in about the same proportion as the tensile strength.

I claim as my invention:

1. A sleeve joint for sucker rods, the rods each comprising a stem having a head, each head having a pin adapted to be threaded into one end of the sleeve, the pin of the other rod being threaded into the other end of said sleeve, said threaded portions of each of said pins being of substantially uniform diameter at the outside of the pin and at the base of the thread to a point where the tensile strength of the pin is substantially equal to the shearing strength of the threads, the diameter at the base of the threads for the remainder of the threaded portion being progressively larger towards that end of the pin which joins the head of the rod.

2. An end for a sucker rod, comprising: a head; a pin joined to said head; and a thread of substantially uniform outside diameter formed on said pin, a portion of the thread at the extreme end of the pin being of uniform depth for a sufficient distance to make the shearing value of the thread substantially equal to the tensile strength of said pin at the base of such portion of the thread, and the remainder of the said thread being of decreasing depth towards the point of juncture of the pin with the head.

3. A sleeve joint for sucker rods, one of the rods having a head of approximately the same diameter as the sleeve, said head having a pin adapted to be threaded into one end of the sleeve, the other rod having a head of the same diameter, with a pin threaded into the other end of the sleeve, each of said pins being longer than the recess in the sleeve for receiving it and having a conical end adapted to be tightly engaged in a correspondingly shaped cavity at the bottom of the recess before said head comes into contact with said sleeve, each of said pins having a thread of uniform outside diameter and of uniform base diameter for a sufficient distance from said conical end to make the shearing value of the thread substantially equal to the tensile strength of said pin at the base of such portion of the thread, and of progressively increasing base diameter for the remainder of the length of the pin.

In testimony whereof, I have hereunto set my hand at Los Angeles, California, this 23rd day of March 1923.

JULE C. AXELSON.